United States Patent [19]
Citta et al.

[11] Patent Number: 5,956,325
[45] Date of Patent: Sep. 21, 1999

[54] ADAPTIVE RANDOM ACCESS PROTOCOL FOR CATV NETWORKS

[75] Inventors: Richard W. Citta, Oak Park; David D. Lin, Evanston; Jingsong Xia, Mundelein, all of Ill.

[73] Assignee: Zenith Electronics Corporation, Glenview, Ill.

[21] Appl. No.: 08/734,909

[22] Filed: Oct. 22, 1996

Related U.S. Application Data

[60] Provisional application No. 60/006,025, Oct. 24, 1995, and provisional application No. 60/008,054, Oct. 30, 1995.

[51] Int. Cl.$^6$ ....................................................... H04J 3/14
[52] U.S. Cl. ........................... 370/252; 370/322; 370/348; 370/461; 370/468
[58] Field of Search ..................................... 370/252, 322, 370/348, 431, 443, 447, 449, 461, 468, 477; 348/12, 13

[56] References Cited

U.S. PATENT DOCUMENTS

| | | | |
|---|---|---|---|
| 5,012,469 | 4/1991 | Sardana | 370/447 |
| 5,185,737 | 2/1993 | Nassehi et al. | 370/449 |
| 5,440,555 | 8/1995 | Momona | 370/468 |
| 5,590,131 | 12/1996 | Kabatepe | 370/461 |

*Primary Examiner*—Douglas W. Olms
*Assistant Examiner*—Shick Hom

[57] ABSTRACT

A communication system has a plurality of stations which communicate data in a data frame having a plurality of slots, wherein the plurality of slots are data slots DS and/or minislots MS. A master station determines a range parameter R which is based upon a number of slave stations transmitting reservation requests in a data frame, the master station determines a minislot parameter MP according to a number of reservation requests in a queue waiting to be processed by the master station, and the master station transmits the range parameter R and the minislot parameter MP to a plurality of slave stations. Each slave station independently determines a random transmission parameter N. Each slave station transmits a reservation request to the master station if its random transmission parameter N corresponds to the minislot parameter MP and abstains from transmitting a reservation request to the master station if its random transmission parameter N does not correspond to the minislot parameter MP.

49 Claims, 5 Drawing Sheets

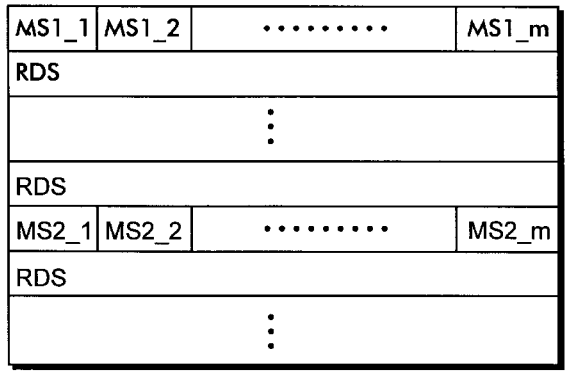
Figure 5
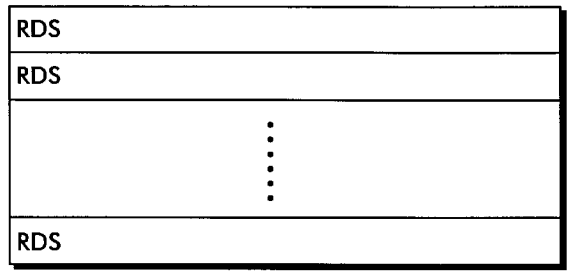
Figure 6
Figure 7
Figure 8
| Segmentation Type | Value |
|---|---|
| Single Segment Message (SSM) | 00 |
| Beginning of Message (BOM) | 01 |
| Continuation of Message (COM) | 10 |
| End of Message (EOM) | 11 |
Figure 9
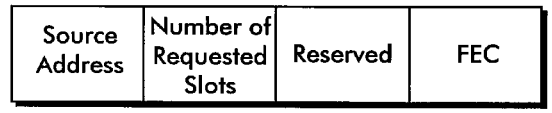
Figure 10

ADAPTIVE RANDOM ACCESS PROTOCOL FOR CATV NETWORKS

RELATED APPLICATION

This application claims the benefit of U.S. Provisional Application No. 60/006,025 filed Oct. 24, 1995 and U.S. Provisional Application No. 60/008,054 filed Oct. 30, 1995.

TECHNICAL FIELD OF THE INVENTION

The present invention relates to a protocol for a communication system in which multiple stations share access to a common communication channel according to a time division multiple access format.

BACKGROUND OF THE INVENTION

Communication systems typically include a plurality of stations connected to one another over a common communication channel. For example, in a community antenna television (CATV) system, a headend is connected by a cable to a plurality of subscriber stations. The cable supports downstream communication from the headend to the subscriber stations and upstream communication from the subscriber stations to the headend. Data, which is transmitted between the headend and the subscriber stations, is transmitted in data frames. Accordingly, when the headend communicates with a subscriber station, the headend transmits a downstream data frame to the subscriber station, and when a subscriber station communicates with the headend, the subscriber station transmits an upstream data frame to the headend.

In such a CATV system, the headend and the subscriber stations must share the resources of the cable in some manner. For example, downstream and upstream communications are typically allocated to different frequency ranges. In a sub-split allocation, downstream communications are allocated to a frequency range between 54 MHz and 750 MHz and above, while the upstream communications are allocated to a frequency range below 42 MHz. In a mid-split allocation, downstream communications are allocated to a frequency range of 162 MHz and above, while upstream communications are allocated to a frequency range between 5 to 100 MHz. In a high-split allocation, downstream communications are allocated to a frequency range of 234 MHz and above, while upstream communications are allocated to a frequency range between 5 MHz and 174 MHz.

Moreover, the subscriber stations must also share the resources of the cable in some manner. In a time division multiple access (TDMA) CATV system, the subscriber stations typically share the cable by transmitting data during uniquely assigned and non-overlapping time periods. In a frequency division multiple access (FDMA) CATV system, the subscriber stations share the cable by dividing up the available upstream frequency bandwidth into numerous narrow frequency channels and by allocating to each subscriber station its own corresponding narrow frequency band. In a code division multiple access (CDMA) CATV system, the subscriber stations share the cable by multiplying their data messages by corresponding assigned code words and then transmitting the result.

A TDMA system, which assigns each subscriber station to a unique time slot, avoids collisions of data transmitted by the subscriber stations but restricts the amount of data throughput from the subscriber stations to the headend. An FDMA system, which allocates to each subscriber station its own corresponding narrow frequency band, similarly restricts throughput because the number of frequency bands allocated to the subscriber stations is limited. CDMA system likewise limits throughput over a communication cable because the number of code words which are available to be assigned to subscriber stations is limited.

In order to increase throughput of the data transmitted by the subscriber stations to the headend of a CATV system, it is known to divide the upstream data frame which supports communication from the subscriber stations to the headend into a number of minislots and data slots. Those subscriber stations, which have data to transmit to the headend, are required to insert a reservation request in a minislot of the current upstream data frame (i.e., the upstream data frame at discrete time n). This reservation request requests the headend to reserve data slots in a subsequent upstream data frame (e.g., the upstream data frame at discrete time n+1) for use by those subscriber stations.

Because the number of minislots in an upstream data frame utilized by such current systems is limited, contention between subscriber stations for access to the limited number of minislots results in frequent collisions between reservation requests. However, it is hoped that at least some reservation requests will be successfully transmitted by subscriber stations to the headend without collision. Therefore, it is generally thought that eventually all subscriber stations will be able to transmit their data to the headend in data slots reserved for that purpose. Yet, because the number of minislots in such systems is limited and fixed, the throughput in such a system is correspondingly limited.

The present invention is directed to an adaptive random access system which adaptively varies the number of minislots in a data frame in order to increase data throughput.

SUMMARY OF THE INVENTION

In accordance with one aspect of the present invention, a method of transmitting data between a plurality of stations comprises the steps of (a) determining a range parameter R, wherein the range parameter R is based upon a number of stations transmitting reservation requests, (b) determining a minislot parameter MP, wherein the minislot parameter MP is based upon a number of reservation requests waiting to be processed, (c) transmitting the range parameter R and the minislot parameter MP to at least some of the stations, (d) determining a transmission parameter N at the stations which receive the range parameter R and the minislot parameter MP, wherein the transmission parameter N is determined on the basis of the range parameter R, (e) if the transmission parameter N corresponds to the minislot parameter MP, transmitting a reservation request from the stations which receive the range parameter R and the minislot parameter MP, and (f) if the transmission parameter N does not correspond to the minislot parameter MP, abstaining from transmitting a reservation request from the stations which receive the range parameter R and the minislot parameter MP.

In accordance with another aspect of the present invention, a communication system has a plurality of stations which communicate data in a data frame having a plurality of slots. The plurality of slots are data slots DS and/or minislots MS. The communication system comprises range parameter R determining means, minislot parameter MP determining means, first station transmitting means, transmission parameter $N_1$ determining means, transmission parameter $N_2$ determining means, second station transmitting means, and third station transmitting means. The range parameter R determining means is at a first station and determines a range parameter R. The minislot parameter MP determining means is at the first station and determines a minislot parameter MP. The first station transmitting means is at the first station and transmits the range parameter R and the minislot parameter MP to second and third stations. The transmission parameter $N_1$ determining means is at the second station and determines a random transmission parameter $N_1$ within a range corresponding to the range parameter R. The transmission parameter $N_2$ determining means is at the third station and determines a random transmission parameter $N_2$ within a range corresponding to the range parameter R. The second station transmitting means is at the second station, the second station transmitting means transmits a reservation request to the first station if the random transmission parameter $N_1$ is within the minislot parameter MP, and the second station transmitting means abstains from transmitting a reservation request to the first station if the random transmission parameter $N_1$ is not within the minislot parameter MP, wherein a reservation request, if any, is transmitted by the second station transmitting means in a minislot. The third station transmitting means is at the third station, the third station transmitting means transmits a reservation request to the first station if the random transmission parameter $N_2$ is within the minislot parameter MP, and the third station transmitting means abstains from transmitting a reservation request to the first station if the random transmission parameter $N_2$ is not within the minislot parameter MP, wherein a reservation request, if any, is transmitted by the third station transmitting means in a minislot.

In accordance with yet another aspect of the present invention, a communication system comprises a master station, a plurality of slave stations, and a frame controlling means. The plurality of slave stations communicate data to the master station in a data frame having MS minislots and/or DS data slots, wherein MS may vary from MSmin to $MS_{max}$, and wherein DS may vary from $DS_{min}$ to $DS_{max}$. The frame controlling means is at the master station and controls the MS minislots and the DS data slots in a data frame.

In accordance with a further aspect of the present invention, a receiver comprises a receiving means, a transmission parameter generating means, and transmitting means. The receiving means receives a downstream data frame having a range parameter and a variable minislot parameter. The transmission parameter generating means generates a transmission parameter, wherein the transmission parameter is less than about the range parameter. The transmitting means transmits a reservation request in a minislot of an upstream data frame if the transmission parameter corresponds to the minislot parameter and abstains from transmitting a reservation request if the transmission parameter does not correspond to the minislot parameter.

In accordance with a still further aspect of the present invention, a receiver comprises a receiving means, a transmission parameter generating means, and a transmitting means. The receiving means receives a downstream data frame having a range parameter R and a variable minislot parameter MP. The transmission parameter generating means generates a transmission parameter N, wherein the transmission parameter N is less than about R. The transmitting means randomly transmits a reservation request on the basis of the transmission parameter N, the variable minislot parameter MP, and the range parameter R, wherein the reservation request is transmitted in a minislot of an upstream data frame.

BRIEF DESCRIPTION OF THE DRAWINGS

These and other features and advantages of the present invention will become more apparent from a detailed consideration of the invention when taken in conjunction with the drawings in which:

FIG. 1 is a schematic diagram of a CATV system which includes a headend connected to a plurality of subscriber stations by way of a cable and which is exemplary of a communication system configured in accordance with the present invention;

FIG. 2 illustrates a downstream data frame transmitted by the headend to the subscriber stations of FIG. 1;

FIGS. 3–6 illustrate examples of upstream data frames which correspond to the downstream data frame shown in FIG. 2;

FIG. 7 illustrates a data slot format of the upstream data frame;

FIG. 8 illustrates a control field format for the data slot illustrated in FIG. 7;

FIG. 9 illustrates a set of functions identified by a segmentation field of the control field format for the data slot illustrated in FIG. 7;

FIG. 10 illustrates a minislot format of the upstream data frame;

DETAILED DESCRIPTION

Figures 1, 2, 3, 4:
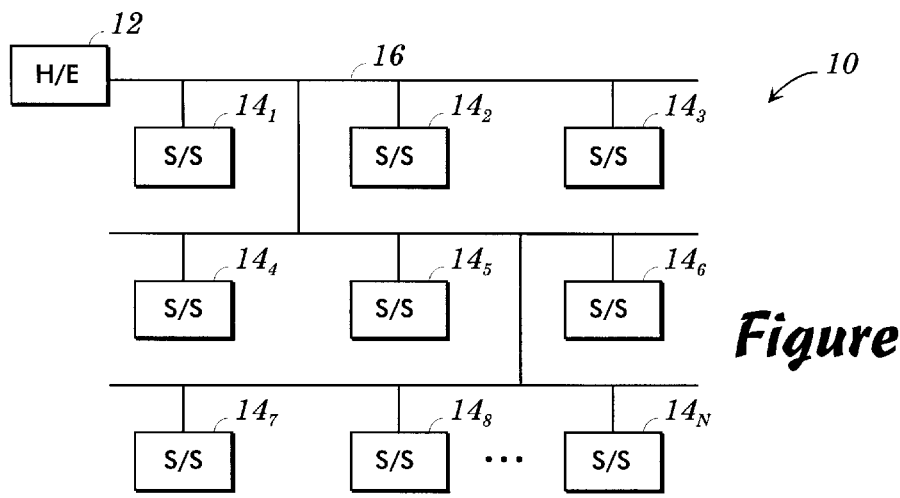

FIG. 1 illustrates a CATV system 10 which includes a headend 12, a plurality of subscriber stations $14_1$–$14_n$, and a cable 16 which interconnects the headend 12 and the subscriber stations $14_1$–$14_n$. The headend 12 may be of conventional hardware design incorporating a processor which may be programmed to support downstream communication over the cable 16 in accordance with the present invention. Similarly, the subscriber stations $14_1$$14_n$ may be of conventional hardware design each incorporating a processor which may be programmed to support upstream communications over the cable 16 in accordance with the present invention.

According to the present invention, when the subscriber stations $14_1$–$14_n$ have data to communicate to the headend 12 over the cable 16, those subscriber stations first make a reservation request. In making a reservation request, the subscriber stations $^{14}{}_1$–$14_n$ contend with one another for a limited but variable number of minislots in the upstream data frame because minislots carry the reservation requests from the subscriber stations $^{14}{}_1$–$14_n$ to the headend 12. With respect to those reservation requests which are successfully received by the headend 12 (i.e., received by the headend 12 in minislots in which there are no collisions), the headend 12 acknowledges the reservation request by way of an acknowledgement transmitted by the headend 12 to the successful subscriber stations $14_1$–$14_n$. Accordingly, the upstream data frame is divided into slots S some or most of which are subdivided into minislots MS such that all contention and reservation activity takes place in the minislots of the upstream data frame and all data transmission takes place in un-subdivided reserved data slots RDS of the slots S.

The split between minislots and reserved data slots is specified by the headend 12 in the downstream data frame.

In this regard, the downstream data frame contains parameters which determine the number of minislots and the number of reserved data slots in the next upstream data frame. The subscriber stations $14_1$–$14_n$ use these parameters in order to make a decision as to whether they can transmit reservation requests. Accordingly, the subscriber station $14_1$–$14_n$ contend for the bandwidth of the upstream channel. A successful reservation request results in the headend 12 allocating one or more reserved data slots, based on availability, to each of the subscriber stations which had transmitted successful reservation requests. The number of reserved data slots which are available to any one subscriber station depends on the number of subscriber stations making successful reservation requests.

The sizes of the upstream and downstream data frames may be equal, may be fixed, and may be defined, for example, to have a size equal to at least the sum of the headend processing time and the round trip transmission delay of the cable 16.

An exemplary downstream data frame is illustrated in FIG. 2. Each such downstream data frame has four sections. The first section contains a contention range parameter R. The range parameter R may be used by the subscriber stations $14_1$–$14_n$ to contend for minislots when the contending subscriber stations have data to be transmitted. The second section (MP) of the downstream data frame contains a minislot parameter MP. The minislot parameter MP may be a map which defines which slots of the next upstream data frame are minislots and which slots are data slots. This map is particularly useful if minislots and reserved data slots are interspersed throughout the upstream data frames. Alternatively, the minislot parameter MP may be a boundary which separates minislots and reserved data slots in the upstream data frames. In this case, minislots and reserved data slots are segregated. In either case, the minislot parameter MP determines the number of minislots in the upstream data frame. The third section of the downstream data frame is devoted to the acknowledgement of the reservation requests that are made by the subscriber stations $14_1$–$14_n$ to the headend 12 in a previous upstream data frame. Each acknowledgement field (ACK) may include, for example, (i) a station ID, which is the address of the subscriber station to which an acknowledgement is given, and (ii) the data slot or data slots which are reserved to the subscriber station that is identified by the station ID and in which the identified subscriber station may transmit data to the headend 12. The fourth section of the downstream data frame contains reserved data slots which may be used by the headend 12 to communicate data to the subscriber stations $14_1$–$14_n$.

The upstream data frame is illustrated in FIGS. 3–6 under various load conditions. In the upstream channel, the subscriber stations $14_1$–$14_n$ use the minislot parameter MP of the previous downstream data frame in order to define the next upstream data frame. The upstream data frame contains a plurality of slots. As shown in FIG. 3, each of the slots is subdivided into contention minislots Ms during light load conditions (such as during system start up) in which few subscriber stations contend for the available minislots. A slot may be subdivided into a fixed number m of minislots. The minislots MS may be used by the subscriber stations in order to transmit reservation requests to the headend 12 under normal contention activity.

As indicated by FIG. 4, the number of minislots changes dynamically, as discussed below, dependent upon the extent of contention and of reservation requests in the reservation request queue at the headend 12. Thus, as shown in FIG. 4, after contention activity between the subscriber stations $14_1$–$14_n$ has taken place, some of the slots in the next upstream data frame are mapped as minislots MS, and some of the slots in the next upstream data frame are mapped as reserved data slots RDS. However, there may be relatively more minislots MS than reserved data slots RDS. As illustrated in FIG. 4, minislots MS and reserved data slots RDS may be mixed throughout the upstream data frame depending upon the map.

FIG. 5 illustrates an upstream data frame during heavy traffic conditions. The data frame has a decreased number of minislots MS and an increased number of reserved data slots RDS. FIG. 6 illustrates an upstream data frame as a result of blocking. Blocking is a condition which occurs when contention is so high that only a minimum number (such as zero) of minislots are provided in the upstream data frame.

FIG. 7 illustrates the data which is inserted into a reserved data slot RDS by a subscriber station. This data includes a source address representing the address of the sending subscriber station, a control field, reserved space, a payload, and error checking data. As shown in FIG. 8, which illustrates an example of the construction of the control field shown in FIG. 7, the control field may have two subfields. One of these subfields may be a segmentation subfield which carries information according to FIG. 9, for example. The other of these two subfields may be a message identifier field which contains other identifying information.

FIG. 10 illustrates the data inserted by a subscriber station into a minislot. This data includes the source address of the corresponding subscriber station, the number of reserved slots requested by the corresponding subscriber station, space reserved for future use, and forward error correction (FCC) information.

Figure 11A:
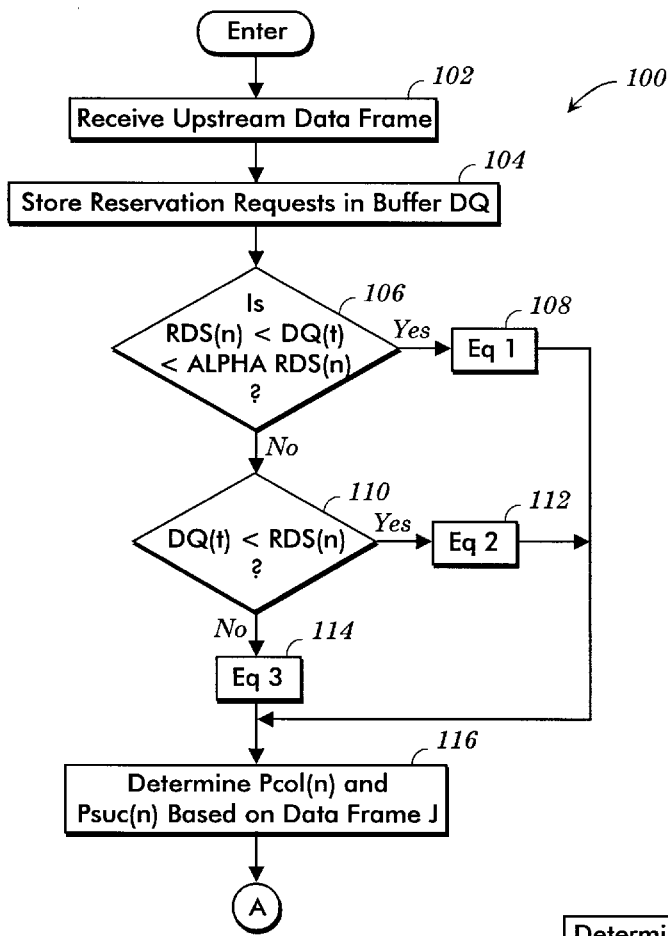
FIGS. 11A and 11B illustrate a program which is executed by the headend of FIG. 1 in an exemplary implementation of the present invention.
Figure 11B:
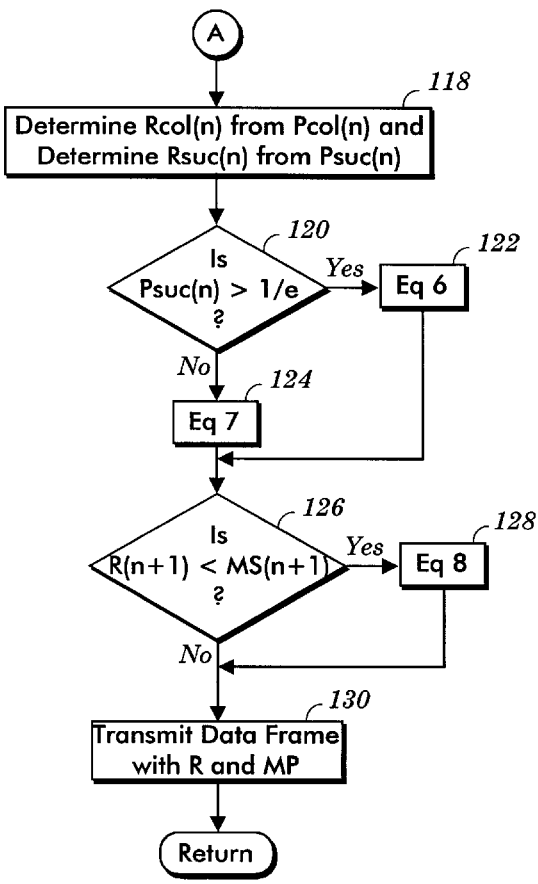

In determining (i) the number of minislots MS for the next upstream data frame and (ii) the range parameter R which is used by the subscriber stations $14_1$–$14_n$ to determine if they can transmit reservation requests, the processor of the headend 12 executes a program 100 which is illustrated in FIGS. 11A and 11B.

The program 100 is entered each time that an upstream data frame is received by the headend 12. When the program 100 is entered, a block 102 receives an upstream data frame, and a block 104 stores any reservation requests in this data frame in a reservation request queue DQ at the current time. The block 104 also stores the number of empty minislots, the number of collision minislots (i.e., minislots in which reservation requests collided), and/or the number of successful minislots (i.e., minislots containing single reservation requests).

Thereafter, a block 106 determines whether the CATV system 10 is in steady state. When the system is in steady state, the number of reservation requests DQ(n) stored in the reservation request queue DQ at the current discrete time n is greater than the number of reserved data slots RDS(n) in the data frame just received by the block 102, but is less than this number of reserved data slots RDS(n) multiplied by a constant α. The upstream data frame just received is designated herein as upstream data frame n and is received at discrete time n. If the system is in steady state, a block 108 determines the number of minislots MS to be allocated to the next upstream data frame n+1 according to the following equation:

$$MS(n+1) = M = \frac{S}{\frac{k}{e} + \frac{1}{m}} = \frac{Sem}{e + km} \qquad (1)$$

wherein S is the total number of slots in a data frame, m is the number of minislots into which a slot may be subdivided, e is 2.718281828 . . . , MS(n+1) is the number of minislots for the next upstream data frame, k is the average number of data slots reserved by reservation requests, and M is the steady state number of minislots.

If the block 106 determines that the CATV system 10 is not in steady state, a block 110 determines whether the number of reservation requests DQ(n) in the reservation request queue DQ of the headend 12 at discrete time n is less than the number of reserved data slots RDS(n) in the upstream data frame just received. If so, a block 112 determines the number of minislots MS to be allocated to the next upstream data frame n+1 according to the following equation:

$$MS(n+1) = m(S - DQ(n)) \qquad (2)$$

wherein DQ(n) is the number of reservation requests DQ(n) in the reservation request queue DQ of the headend 12 at time n.

If the block 106 determines that the CATV system 10 is not in steady state, and if the block 110 determines that the number of reservation requests DQ(n) in the reservation request queue DQ of the headend 12 at discrete time n is not less than the number of reserved data slots RDS(n) in the upstream data frame just received, a block 114 determines the number of minislots MS to be allocated to the next upstream data frame n+1 according to the following equation:

$$MS(n+1) = M - m\frac{DQ(n) - \alpha RDS(n)}{6} \qquad (3)$$

where RDS(n) is the number of reserved data slots in the upstream data frame just received.

A block 116 determines a collision rate Pcol(n) associated with the upstream data frame just received by setting the collision rate Pcol(n) equal to the number of collision minislots (i.e., the minislots in which reservation requests from the subscriber stations $14_1$–$14_n$ collided) as saved by the block 104. The collision rate Pcol(n) pertains to the upstream data frame just received by the block 102 and may be a normalized number. The block 116 also determines a successful rate Psuc(n) by setting the successful rate Psuc(n) equal to the number of successful minislots (i.e., the non-empty minislots in which reservation requests from the subscriber stations $14_1$–$14_n$ did not collide as saved by the block 104). The successful rate Psuc(n) pertains to the upstream data frame just received by the block 102 and may be a normalized number. In addition, if desired, the unused slot rate Pempty(n) may also be determined by the block 116 by setting the unused slot rate Pempty(n) equal to the number of empty minislots as saved by the block 104. The unused slot rate Pempty(n) pertains to the upstream data frame just received by the block 102 and may be a normalized number.

These rates, as will be discussed hereinafter, are used in order to determine the range parameter R which is transmitted by the headend 12 to the subscriber stations $14_1$–$14_n$. The collision rate Pcol(n) and the successful rate Psuc(n) may each be normalized to 100. The block 116 may normalize the unused slot rate Pempty(n) in a similar manner.

A block 118 determines a collision parameter Rcol(n) from the collision rate Pcol(n) according the following equation:

$$Pcol(n) = 1 - \left(\frac{Rcol(n)}{MS(n)-1}\right)\left(\frac{MS(n)-1}{MS(n)}\right)^{(Rcol(n))} - \left(\frac{MS(n)-1}{MS(n)}\right)^{Rcol(n)} \qquad (4)$$

where Pcol(n) is the collision rate Pcol(n) determined by the block 116, MS(n) is the total number of minislots in the upstream data frame just received by the block 102, and the collision parameter Rcol(n) is to be determined from equation (4).

Figure 12:
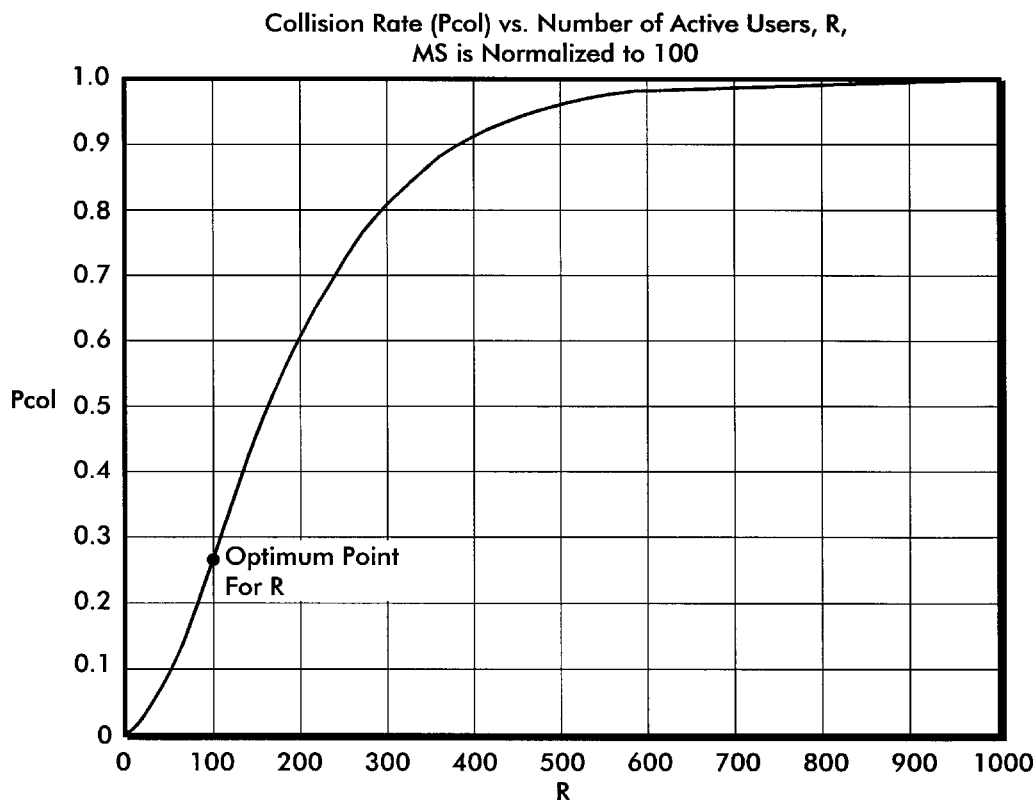
FIGS. 12 and 13 are graphs useful in explaining the program of FIGS. 11A and 11B.

Alternatively, the collision parameter Rcol(n) may be determined from a lookup table which is stored in memory at the headend 12 according to the graph shown in FIG. 12 and which may correspond to equation (4). The vertical axis of this graph is the input axis. The number of minislots in which collisions occurred in the upstream data frame just received divided by the total number of minislots in the upstream data frame just received is input along the vertical axis. The horizontal axis is the output axis along which the collision parameter Rcol(n) is determined as a function of the vertical axis.

The range parameter R may be determined only from the collision parameter Rcol(n). However, the range parameter R is preferably determined from both the collision parameter Rcol(n) and a successful parameter Rsuc(n). The block 118, therefore, also determines the successful parameter Rsuc(n) from the successful rate Psuc(n) according to the following equation:

$$Psuc(n) = \left(\frac{Rsuc(n)}{MS(n)-1}\right)\left(\frac{MS(n)-1}{MS(n)}\right)^{Rsuc(n)} \qquad (5)$$

where Psuc(n) is the successful rate Psuc(n) determined by the block 116, MS(n) is the total number of minislots in the upstream data frame just received by the block 102, and the successful parameter Rsuc(n) is to be determined from equation (5).

Figure 13:
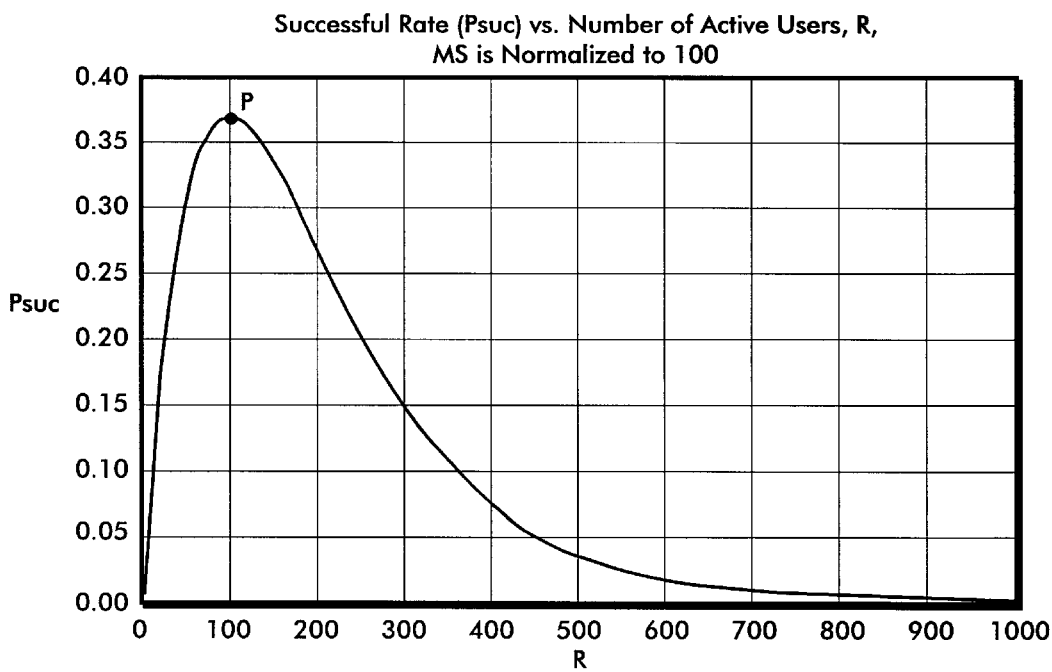
Figure 14:
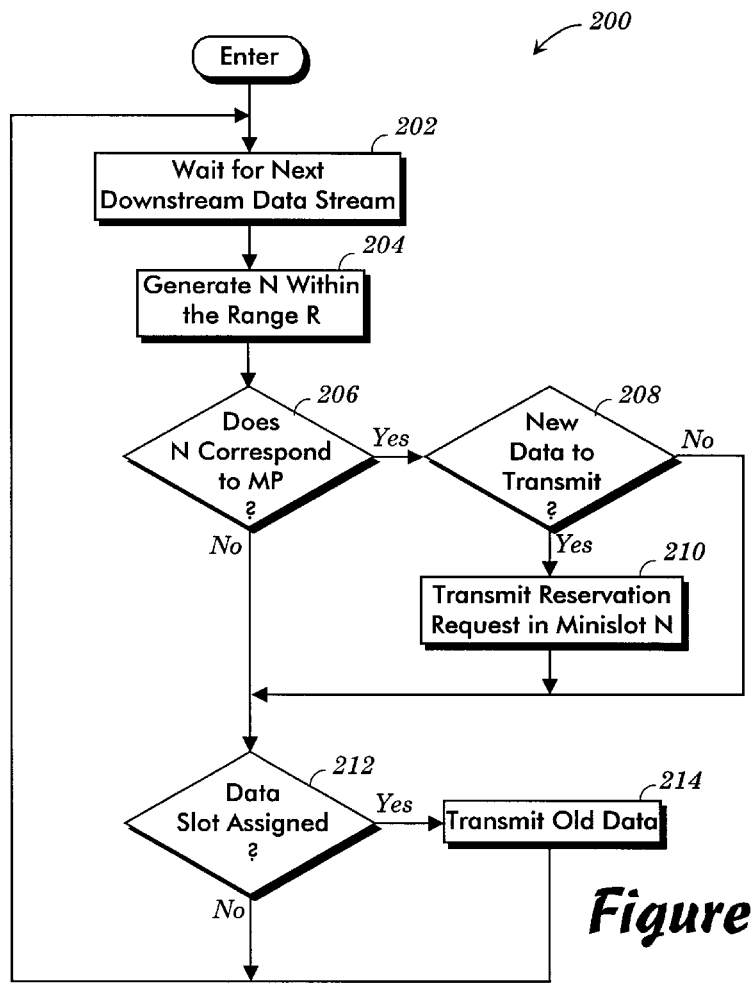
FIG. 14 illustrates a program which is executed by each of the subscriber stations of FIG. 1 in the exemplary implementation of the present invention; and, FIG. 15 illustrates an example of the allocation of minislots according to the present invention.

Alternatively, the successful parameter Rsuc(n) may be determined from a lookup table which is stored in memory at the headend 12 according to the graph shown in FIG. 13 and which may correspond to equation (5). The vertical axis of this graph is the input axis. The number of minislots in which a single reservation request occurred in the upstream data frame just received divided by the total number of minislots in the upstream data frame just received is input along the vertical axis. The horizontal axis is the output axis along which the successful parameter Rsuc(n) is determined as a function of the input vertical axis. When using the graph of FIG. 13, an ambiguity arises because there are two output values along the horizontal axis for each input along the vertical axis. This ambiguity may be resolved by determining from the graph of FIG. 14 which of the two output values should be used. FIG. 14 is described below.

A block 120 determines whether the successful rate Psuc(n) is greater than 1/e. If the successful rate Psuc(n) is greater than 1/e, the range parameter R(n+1) to be used in connection with the next upstream data frame n+1 is determined by a block 122 according to the following equation:

$$R(n+1) = R(n)\frac{Rcol(n) + 100}{200} \qquad (6)$$

where R(n) is the range parameter applicable to the upstream data frame just received by the block 102, and where Rcol(n) is determined from the equation (4).

On the other hand, if the successful rate Psuc(n) is not greater than 1/e, the range parameter R(n+1) to be used in connection with the next upstream data frame n+1 is determined by a block 124 according to the following equation:

$$R(n+1) = R(n) \frac{Rcol(n) + Rsuc(n)}{200} \quad (7)$$

where R(n) is the range parameter applicable to the upstream data frame just received by the block 102, Rcol(n) is determined from the equation (4), and Rsuc(n) is determined according to equation (5).

After the block 122 or the block 124 determines the range parameter R(n+1) to be used in connection with the next upstream data frame n+1, a block 126 determines if the range parameter R(n+1) to be used in connection with the next upstream data frame n+1 is less than the number of minislots for the next upstream data frame MS(n+1). If so, a block 128 determines the next range parameter R to be transmitted by the headend 12 to the subscriber stations $14_1$–$14_n$ (i.e., R(n+1)) according to the following equation:

$$R(n+1)=MS(n+1) \quad (8)$$

where MS(n+1) is the number of minislots for the next upstream data frame as determined by the blocks 106–114. If not, the next range parameter R to be transmitted by the headend 12 to the subscriber stations $14_1$–$14_n$ (i.e., R(n+1)) is the range parameter R(n+1) determined by the block 122 or by the block 124 as described above.

When the range parameter R(n+1) has been determined by the blocks 120–128 and the number of minislots parameter MS(n+1) has been determined by the blocks 106–114 as described above, a block 130 transmits the next downstream data frame which includes (i) the range parameter R based upon the value of the range parameter R(n+1), (ii) the minislot parameter MS based upon the minislot parameter MS(n+1), (iii) acknowledgements based on some or all of the reservation requests in the reservation request queue DQ, and (iv) any data for the subscriber stations.

Each of the subscriber stations $14_1$–$14_n$ executes a program 200 as shown in FIG. 14. When the program 200 is entered, a block 202 causes the corresponding subscriber station to wait for the next downstream data frame which contains the range parameter R, the minislot parameter MP, and acknowledgements (which include reserved slot allocations to the subscriber station). When the next downstream data frame is received, a block 204 generates a transmission parameter N within the range established by the range parameter R which is contained in the downstream data frame just received from the headend 12. The range established by the range parameter R may be the range between zero and R inclusive, the range between one and R inclusive, or the like. The transmission parameter N is used to determine whether its corresponding subscriber station is permitted to transmit a reservation request to the headend 12. The transmission parameter N may be generated by the block 204 as a random number. Thus, because each subscriber station $14_1$–$14_n$ generates its own transmission parameter N as a random value within the range established by the range parameter R, the transmission probabilities of the subscriber stations $14_1$–$14_n$ are statistically spread along the interval of the range R.

A block 206 determines whether the value of N just generated by the block 204 corresponds to the minislot parameter MP contained in the downstream data frame just received from the headend 12. That is, if the minislot parameter MP is a map, the block 206 determines whether the value of N is equal to one of the minislots defined in the map. On the other hand, if the minislot parameter MP is a boundary, the block 206 determines whether the value of N is less than or equal to the minislot parameter MP. If the value of N corresponds to the minislot parameter MP, a block 208 determines whether the subscriber station has new data to transmit to the headend 12. New data is data for which a previous reservation request has not been made by the appropriate subscriber station. If so, a block 210 inserts a transmission reservation request in the minislot which is equal to the value of N and which is in the upstream data frame being assembled for transmission back to the headend 12.

If the block 206 determines that the value of N does not correspond to the minislot parameter MP, or if the block 208 determines that the subscriber station has no new data to transmit to the headend 12, or after the block 210 has inserted a reservation request in the minislot having a value equal to N, a block 212 determines whether the downstream data frame just received has reserved a data slot in the next upstream data frame within which the subscriber station may transmit old data. Old data is data for which a previous reservation request had been made by the appropriate subscriber station. If so, a block 212 inserts this old data into the data slot reserved for this subscriber station.

If the block 212 determines that a data slot had not been reserved for the subscriber station, or after the block 214 inserts old data into a data slot reserved in response to a previous reservation request, the program 200 returns to the block 202 to await the next downstream data frame.

Accordingly, the present invention adaptively allocates channel resources dependent upon the amount of demand created by the subscriber stations for the upstream channel. As the number of subscriber stations having data to transmit to the headend 12 increases, the chance that collisions will occur in the upstream data frames also increases. As the number of collisions in the upstream data frames increases, the value of the range parameter R is increased which tends to decrease the probability that a subscriber station will be able insert a reservation request in a minislot of subsequent upstream data frames. Moreover, as the number of subscriber stations having data to transmit to the headend 12 increases, the number of reservation requests in the reservation request queue DQ of the headend 12 also increases. As the number of reservation requests in the reservation request queue DQ increases, the number of minislots that are allocated to subsequent upstream data frames decreases.

Similarly, as the number of subscriber stations having data to transmit to the headend 12 decreases, the chance that collisions will occur in the upstream data frames also decreases. As the number of collisions in the upstream data frames decreases, the value of the range parameter R is decreased which tends to increase the probability that a subscriber station will be able insert a reservation request in a minislot of subsequent upstream data frames. Moreover, as the number of subscriber stations having data to transmit to the headend 12 decreases, the number of reservation requests in the reservation request queue DQ of the headend 12 also decreases. As the number of reservation requests in the reservation request queue DQ decreases, the number of minislots that are allocated to subsequent upstream data frames increases.

Thus, as the number of reservation requests increases, the headend 12 decreases the number of minislots allocated to subscriber stations in order to reduce the number of successful reservation requests being transmitted by the subscriber stations in the upstream data frames. Also, as the number of collisions in minislots of upstream data frames increases, the value of the range parameter R is increased which has the effect of reducing the number of subscriber stations permitted to transmit reservation requests in the minislots which are allocated to subsequent upstream data frames. Accordingly, the minislot parameter and the range parameter R work together to adaptively regulate data traffic in the CATV system 10.

Figure 15:
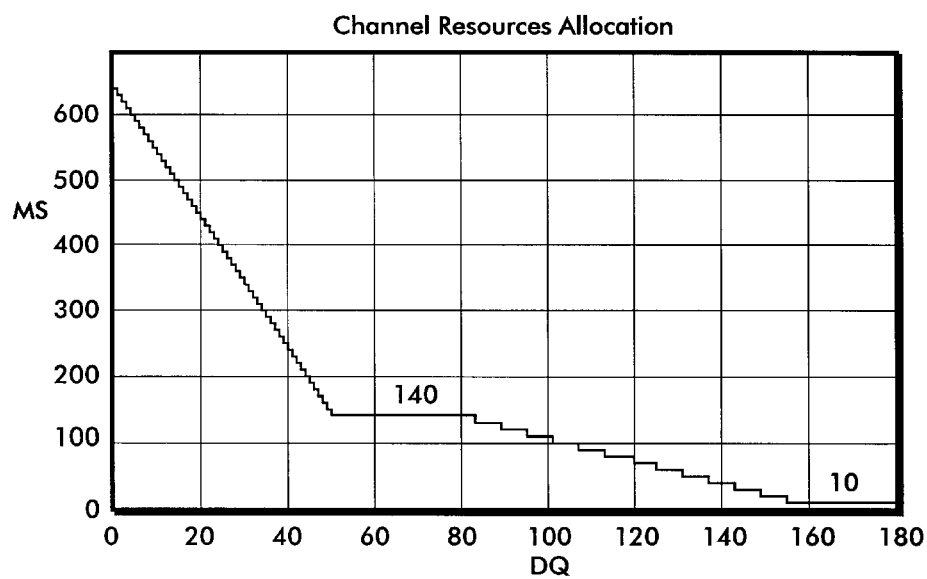

FIG. 15 illustrates the allocation of minislots based on reservation requests in the reservation request queue DQ in an example of the present invention where the number of total slots S in a data frame is 64, where α is 1.6, and where m=10. FIG. 15 shows that the minimum number of minislots allocated to an upstream data frame is not necessarily zero, but may be some non-zero minimum value. In this example, the steady state condition exists when the number of minislots is at 140.

Finally, with the system as described above, the system tends to operate near the peak P shown in FIG. 13 when the system is operating under instantaneous overloading or operating around full capacity.

Certain modifications of the present invention have been discussed above. Other modifications will occur to those practicing in the art of the present invention. For example, as described above, each subscriber station determines its transmission parameter N as a random number which is only constrained to fall within the range established by the range parameter R. Instead, the transmission parameter N may be determined by each subscriber station on a pseudorandom basis or on any other basis which tends to spread the transmission parameters N of the subscriber stations throughout the range R. Therefore, the random generation of the transmission parameter N should be understood to include not only random generation of the transmission parameter N but also pseudorandom generation of the transmission parameter N and generation of the transmission parameter N by similar methods.

Also, the size of the upstream and downstream data frames are described above as being fixed. However, the sizes of the upstream and downstream data frames may be variable so that the size of these data frames, for example, may be dependent upon traffic load.

As described above, the range parameter R is determined as a function of the collision parameter Rcol(n) and the successful parameter Rsuc(n). That is, the range parameter R is determined as a function of the number of minislots of an upstream data frame in which collisions between reservation requests occurred and the number of minislots of an upstream data frame containing single reservation requests. Instead, the range parameter R may be determined as a function of the collision parameter Rcol(n) and an empty parameter Rempty(n), or as a function of the successful parameter Rsuc(n) and the empty parameter Rempty(n). The empty parameter Rempty(n) is determined from an empty rate Pempty(n). The empty rate Pempty(n) may be set equal to the number of empty minislots in the upstream data frame received by the headend 12 from the subscriber stations $14_1$–$14_n$ at discrete time n. The empty parameter Rempty(n) is determined from the following equation:

$$Pempty(n) = \left(\frac{MS(n)-1}{MS(n)}\right)^{Rempty(n)}. \quad (9)$$

It is also noted that the collision rate Pcol(n), the successful rate Psuc(n), and the empty rate Pempty(n) are related according to the following equation:

$$Pcol(n)+Psuc(n)+Pempty(n)=1. \quad (10)$$

Thus, the range parameter R may be determined from one or more of the collision parameter Rcol(n), the successful parameter Rsuc(n), and the empty parameter Rempty(n).

In addition, as described above, the range parameter R may be determined from both R col(n) and Rsuc(n) or from Rcol(n) alone. On the other hand, the range parameter R may be determined from Rsuc(n) alone. However, because the successful curve of FIG. 13 is a double value curve (there are two successful parameters Rsuc(n) for each value along the vertical axis), the collision curve of FIG. 12 is needed to determines which of two values should be used on the successful curve. Therefore, the successful curve cannot as a practical matter be used by itself.

Moreover, as described above, the contention range parameter R is used by the subscriber stations in generating the transmission parameter N when the subscriber stations have data to transmit, regardless of the priority of that data. Alternatively, a contention range parameter $R_L$ may be used by the subscriber stations in generating one transmission parameter $N_L$ when the subscriber stations have low priority data to transmit, and a larger contention range parameter $R_H$ may be used by the subscriber stations in generating another transmission parameter $N_H$ when the subscriber stations have high priority data to transmit. The transmission parameter $N_L$ corresponding to the contention range parameter $R_L$ then determines if the subscriber stations can transmit low priority data, and the transmission parameter $N_H$ corresponding to the contention range parameter $R_H$ then determines if the subscriber stations can transmit high priority data. Accordingly, the subscriber stations have a greater chance of successfully transmitting a reservation request when they have high priority data to transmit.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of transmitting data between a plurality of stations comprising the steps of:

a) determining a range parameter R at a first of the stations, wherein the range parameter R is based upon a number of the stations transmitting reservation requests;

b) determining a slot parameter MP at the first station, wherein the slot parameter MP is based upon a number of reservation requests waiting to be processed;

c) transmitting the range parameter R and the slot parameter MP to others of the stations;

d) determining a transmission parameter N at the other stations which receive the range parameter R and the slot parameter MP, wherein the transmission parameter N is determined on the basis of the range parameter R;

e) transmitting a reservation request from those other stations whose transmission parameter N bears a predetermined relationship to the slot parameter MP; and, f) abstaining from transmitting the reservation request from those other stations whose transmission parameter N does not bear the predetermined relationship to the slot parameter MP.

2. The method of claim 1 wherein step f) comprises the step of abstaining from transmitting a reservation request from the stations which receive the range parameter R and the slot parameter MP if the transmission parameter N is between about the slot parameter MP and about the range parameter R.

3. The method of claim 1 wherein step b) comprises the steps of:

b1) if RDS(n)<DQ(n)<αRDS(n), determining a minislot parameter MS based upon the following equation:

$$MS(n+1) = M = \frac{Sem}{e+km}$$

wherein MS(n+1) is the number of minislots in a data frame at discrete time n+1 and corresponds to the slot parameter MP, wherein RDS(n) is the number of data slots in a data frame at discrete time n, wherein DQ(n) is the number of reservation requests waiting to be processed at time n, wherein α is a constant, wherein M is the number of minislots in steady state, wherein S is the number of slots in a data frame, wherein k is a number corresponding to an average number of data slots reserved by reservation requests, wherein e is 2.718281828 . . . , and wherein m is the number of minislots into which a slot of a data frame may be subdivided;

b2) if DQ(n)<RDS(n), determining the slot parameter MP based upon the following equation:

$$MS(n+1)=m(S-DQ(n))$$

wherein MS(n+1) is the number of minislots in a data frame at discrete time n+1 and corresponds to the slot parameter MP; and, b3) if DQ(n)>αRDS(n), determining the slot parameter MP according to the following equation:

$$MS(n+1) = M - m\frac{DQ(n) - \alpha RDS(n)}{6}$$

wherein MS(n+1) is the number of minislots in a data frame at discrete time n+1 and corresponds to the slot parameter MP.

4. The method of claim 1 wherein step a) comprises the following steps:

$a_1$) if a successful rate Psuc(n) at discrete time n is greater than about c, determining the range parameter R for discrete time n+1 according to the following equation:

$$R(n+1) = R(n)\frac{Rcol(n) + 100}{200}$$

wherein R(n) is the range parameter R at discrete time n, wherein c is a constant, and wherein Rcol(n) is based upon a number of reservation slots in which data collisions occurred at discrete time n;

$a_2$) if the successful rate Psuc(n) at discrete time n is not greater than about c, determining the range parameter R for discrete time n+1 according to the following equation:

$$R(n+1) = R(n)\frac{Rcol(n) + Rsuc(n)}{200}$$

and wherein Rsuc(n) is based upon a number of non-empty reservation slots in which data collisions did not occur at discrete time n; and, $a_3$) if R(n+1)<MS(n+1), determining the range parameter R for discrete time n+1 according to the following equation:

$$R(n+1)=MS(n+1)$$

wherein R(n+1) in inequality R(n+1)<MS(n+1) is determined by step a1) or a2) as appropriate, and MS(n+1) is the number of reservation slots in a data frame at discrete time n+1, and if R(n+1)>MS(n+1), using R(n+1) as determined by step a1) or a2) as appropriate.

5. The method of claim 4 wherein reservation slots are minislots, wherein step b) comprises the steps of:

b1) if RDS(n)<DQ(n)<αRDS(n), determining the slot parameter MP based upon the following equation:

$$MS(n+1) = M = \frac{Sem}{e+km}$$

wherein MS(n+1) is the number of minislots in a data frame at discrete time n+1 and corresponds to the slot parameter MP, wherein RDS(n) is the number of data slots in a data frame at discrete time n, wherein DQ(n) is the number of reservation requests waiting to be processed at time n, wherein α is a constant, wherein M is the number of minislots in steady state, wherein S is the number of slots in a data frame, wherein k is a number corresponding to an average number of data slots reserved by reservation requests, wherein e is 2.718281828 . . . , and wherein m is the number of minislots into which a slot of a data frame may be subdivided;

b2) if DQ(n)<RDS(n), determining the slot parameter MP based upon the following equation:

$$MS(n+1)=m(S-DQ(n))$$

wherein MS(n+1) is the number of minislots in a data frame at discrete time n+1 and corresponds to the slot parameter MP; and, b3) if DQ(n)>αRDS(n), determining the slot parameter MP based upon the following equation:

$$MS(n+1) = M - m\frac{DQ(n) - \alpha RDS(n)}{6}$$

wherein MS(n+1) is the number of minislots in a data frame at discrete time n+1 and corresponds to the slot parameter MP.

6. The method of claim 5 wherein Rcol(n) is determined according to the following equation:

$$Pcol(n) = 1 - \left(\frac{Rcol(n)}{MS(n)-1}\right)\left(\frac{MS(n)-1}{MS(n)}\right)^{(Rcol(n))} - \left(\frac{MS(n)-1}{MS(n)}\right)^{Rcol(n)}$$

and wherein Rsuc(n) is determined according to the following equation:

$$Psuc(n) = \left(\frac{Rsup(n)}{MS(n)-1}\right)\left(\frac{MS(n)-1}{MS(n)}\right)^{Rsup(n)}.$$

7. The method of claim 5 wherein Rcol(n) is determined from a look up table which is generated to substantially satisfy the following equation:

$$Pcol(n) = 1 - \left(\frac{Rcol(n)}{MS(n)-1}\right)\left(\frac{MS(n)-1}{MS(n)}\right)^{(Rcol(n))} - \left(\frac{MS(n)-1}{MS(n)}\right)^{Rcol(n)}$$

and wherein Rsuc(n) is determined from a look up table which is generated to substantially satisfy the following equation:

$$Psuc(n) = \left(\frac{Rsup(n)}{MS(n)-1}\right)\left(\frac{MS(n)-1}{MS(n)}\right)^{Rsup(n)}.$$

8. The method of claim 5 wherein $c \cong 1/e$.

9. The method of claim 1 wherein the others of the stations include first and second other stations, wherein step c) comprises the step of transmitting the range parameter R and the slot parameter MP to the first and second other stations, wherein step d) comprises the steps of determining a transmission parameter $N_1$ at the first other station and of determining a transmission parameter $N_2$ at the second other station, wherein the transmission parameter $N_1$ is a number determined on the basis of the range parameter R, wherein the transmission parameter $N_2$ is a number determined on the basis of the range parameter R, wherein step e) comprises the steps of transmitting a reservation request from the first other station if the transmission parameter $N_1$ corresponds to the slot parameter MP and of transmitting a reservation request from the second other station if the transmission parameter $N_2$ corresponds to the slot parameter MP, and wherein the step f) comprises the steps of abstaining from transmitting a reservation request from the first other station if the transmission parameter $N_1$ does not correspond to the slot parameter MP and of abstaining from transmitting a reservation request from the second other station if the transmission parameter $N_2$ does not correspond to the slot parameter MP parameter MP.

10. The method of claim 9 wherein the step of abstaining from transmitting a reservation request from the first other station comprises the step of abstaining from transmitting a reservation request from the first other station if the transmission parameter $N_1$ is between about the slot parameter MP and about the range parameter R, and wherein the step of abstaining from transmitting a reservation request from the second other station comprises the step of abstaining from transmitting a reservation request from the second other station if the transmission parameter $N_2$ is between about the slot parameter MP and about the range parameter R.

11. The method of claim 9 wherein step b) comprises the steps of:

b1) if RDS(n)<DQ(n)<αRDS(n), determining the slot parameter MP based upon the following equation:

$$MS(n+1) = M = \frac{Sem}{e+km}$$

wherein MS(n+1) is the number of minislots in a data frame at discrete time n+1 and corresponds to the slot parameter MP, wherein RDS(n) is the number of data slots in a data frame at discrete time n, wherein DQ(n) is the number of reservation requests waiting to be processed at time n, wherein α is a constant, wherein M is the number of minislots in steady state, wherein S is the number of slots in a data frame, wherein k is a number corresponding to an average number of data slots reserved by reservation requests, wherein e is 2.718281828 . . . , and wherein m is the number of minislots into which a slot of a data frame may be subdivided;

b2) if DQ(n)<RDS(n), determining the slot parameter MP based upon the following equation:

$$MS(n+1) = m(S\ DQ(n))$$

wherein MS(n+1) is the number of minislots in a data frame at discrete time n+1 and corresponds to the slot parameter MP; and, b3) if DQ(n)>αRDS(n), determining the slot parameter MP based upon the following equation:

$$MS(n+1) = M - m\frac{DQ(n) - \alpha RDS(n)}{6}$$

wherein MS(n+1) is the number of minislots in a data frame at discrete time n+1 and corresponds to the slot parameter MP.

12. The method of claim 9 wherein step a) comprises the following steps:

$a_1$) if a successful rate Psuc(n) at discrete time n is greater than about c, determining the range parameter R for discrete time n+1 according to the following equation:

$$R(n+1) = R(n)\frac{Rcol(n) + 100}{200}$$

wherein R(n) is the range parameter R at discrete time n, wherein c is a constant, and wherein Rcol(n) is based upon a number of reservation slots in which data collisions occurred at discrete time n;

$a_2$) if the successful rate Psuc(n) at discrete time n is not greater than about c, determining the range parameter R for discrete time n+1 according to the following equation:

$$R(n+1) = R(n)\frac{Rcol(n) + Rsuc(n)}{200}$$

and wherein Rsuc(n) is based upon a number of non-empty reservation slots in which data collisions did not occur at discrete time n; and, $a_3$) if R(n+1)<MS(n+1), determining the range parameter R for discrete time n+1 according to the following equation:

$$R(n+1) = MS(n+1)$$

wherein R(n+1) in inequality R(n+1)<MS(n+1) is determined by step a1) or a2) as appropriate, and MS(n+1) is the number of reservation slots in a data frame at discrete time n+1, and if R(n+1)>MS(n+1), using R(n+1) as determined by step a1) or a2) as appropriate.

13. The method of claim 12 wherein reservation slots are minislots, wherein step b) comprises the steps of:

b1) if RDS(n)<DQ(n)<αRDS(n), determining the slot parameter MP based upon the following equation:

$$MS(n+1) = M = \frac{Sem}{e+km}$$

wherein MS(n+1) is the number of minislots in a data frame at discrete time n+1 and corresponds to the slot parameter MP, wherein RDS(n) is the number of data slots in a data frame at discrete time n, wherein DQ(n) is the number of reservation requests waiting to be processed at time n, wherein $\alpha$ is a constant, wherein M is the number of minislots in steady state, wherein S is the number of slots in a data frame, wherein k is a number corresponding to an average number of data slots reserved by reservation requests, wherein e is 2.718281828 . . . , and wherein m is the number of minislots into which a slot of a data frame may be subdivided;

b2) if DQ(n)<RDS(n), determining the slot parameter MP based upon the following equation:

$$MS(n+1) = m(S-DQ(n))$$

wherein MS(n+1) is the number of minislots in a data frame at discrete time n+1 and corresponds to the slot parameter MP; and, b3) if DQ(n)>$\alpha$RDS(n), determining the slot parameter MP based upon the following equation:

$$MS(n+1) = M - m\frac{DQ(n) - \alpha RDS(n)}{6}$$

wherein MS(n+1) is the number of minislots in a data frame at discrete time n+1 and corresponds to the slot parameter MP.

14. The method of claim 13 wherein Rcol(n) is determined based upon the following equation:

$$Pcol(n) = 1 - \left(\frac{Rcol(n)}{MS(n)-1}\right)\left(\frac{MS(n)-1}{MS(n)}\right)^{(Rcol(n))} - \left(\frac{MS(n)-1}{MS(n)}\right)^{Rcol(n)}$$

and wherein Rsuc(n) is determined based upon the following equation:

$$Psuc(n) = \left(\frac{Rsup(n)}{MS(n)-1}\right)\left(\frac{MS(n)-1}{MS(n)}\right)^{Rsup(n)}.$$

15. The method of claim 13 wherein Rcol(n) is determined from a look up table which is generated to substantially satisfy the following equation:

$$Pcol(n) = 1 - \left(\frac{Rcol(n)}{MS(n)-1}\right)\left(\frac{MS(n)-1}{MS(n)}\right)^{(Rcol(n))} - \left(\frac{MS(n)-1}{MS(n)}\right)^{Rcol(n)}$$

and wherein Rsuc(n) is determined from a look up table which is generated to substantially satisfy the following equation:

$$Psuc(n) = \left(\frac{Rsup(n)}{MS(n)-1}\right)\left(\frac{MS(n)-1}{MS(n)}\right)^{Rsup(n)}.$$

16. The method of claim 13 wherein c≅1/e.

17. A communication system having a plurality of stations which communicate data in a data frame having a plurality of slots, wherein the plurality of slots are data slots DS and/or reservation slots MS, and wherein the communication system comprises:

range parameter R determining means at a first station for determining a range parameter R;

slot parameter MP determining means at the first station for determining a slot parameter MP;

first station transmitting means at the first station for transmitting the range parameter R and the slot parameter MP to second and third stations;

transmission parameter $N_1$ determining means at the second station for determining a random transmission parameter $N_1$ within a range corresponding to the range parameter R;

transmission parameter $N_2$ determining means at the third station for determining a random transmission parameter $N_2$ within a range corresponding to the range parameter R;

second station transmitting means at the second station for transmitting a reservation request to the first station if the random transmission parameter $N_1$ bears a first predetermined relationship to the slot parameter MP and for abstaining from transmitting a reservation request to the first station if the random transmission parameter $N_1$ does not bear the first predetermined relationship to the slot parameter MP, wherein a reservation request, if any, is transmitted by the second station transmitting means in a reservation slot; and, third station transmitting means at the third station for transmitting a reservation request to the first station if the random transmission parameter $N_2$ bears a second predetermined relationship to the slot parameter MP and for abstaining from transmitting a reservation request to the first station if the random transmission parameter $N_2$ does not bear the second predetermined relationship to the slot parameter MP, wherein a reservation request, if any, is transmitted by the third station transmitting means in a reservation slot.

18. The communication system of claim 17 wherein the second station transmitting means comprises means for abstaining from transmitting a reservation request to the first station if the random transmission parameter $N_1$ is between about the slot parameter MP and about the range parameter R, and wherein the third station transmitting means comprises means for abstaining from transmitting a reservation request to the first station if the random transmission parameter $N_2$ is between about the slot parameter MP and about the range parameter R.

19. The communication system of claim 17 wherein reservation slots are minislots, wherein the slot parameter MP determining means determines the slot parameter MP as follows:

if RDS(n)<DQ(n)<$\alpha$RDS(n), determine the slot parameter MP based upon the following equation:

$$MS(n+1) = M = \frac{Sem}{e+km}$$

wherein MS(n+1) is the number of minislots in a data frame at discrete time n+1 and corresponds to the slot parameter MP, wherein RDS(n) is the number of data slots in a data frame at discrete time n, wherein DQ(n) is the number of reservation requests waiting to be processed by the first station at time n, wherein $\alpha$ is a constant, wherein M is the number of minislots in steady state, wherein S is the number of slots in a data frame, wherein k is a number corresponding to an average number of data slots reserved by reservation requests, wherein e is 2.718281828 . . . , and wherein m is the number of minislots into which a slot of a data frame may be subdivided;

if DQ(n)<RDS(n), determine the slot parameter MP based upon the following equation:

$$MS(n+1) = m(S - DQ(n))$$

wherein MS(n+1) is the number of minislots in a data frame at discrete time n+1 and corresponds to the slot parameter MP; and, if DQ(n)>αRDS(n), determine the slot parameter MP based upon the following equation:

$$MS(n+1) = M - m\frac{DQ(n) - \alpha RDS(n)}{6}$$

wherein MS(n+1) is the number of minislots in a data frame at discrete time n+1 and corresponds to the slot parameter MP.

20. The communication system of claim 17 wherein the range parameter R determining means determines the range parameter R for discrete time n+1 as follows:

if a successful rate Psuc(n) at discrete time n is greater than about c, determining the range parameter R for discrete time n+1 according to the following first equation:

$$R(n+1) = R(n)\frac{Rcol(n) + 100}{200}$$

wherein R(n) is the range parameter R at discrete time n, wherein c is a constant, and wherein Rcol(n) is based upon a number of reservation slots in which data collisions occurred at discrete time n;

if the successful rate Psuc(n) at discrete time n is not greater than about c, determining the range parameter R for discrete time n+1 according to the following second equation:

$$R(n+1) = R(n)\frac{Rcol(n) + Rsuc(n)}{200}$$

and wherein Rsuc(n) is based upon a number of non-empty reservation slots in which data collisions did not occur at discrete time n; and, if R(n+1)<MS(n+1), determining the range parameter R for discrete time n+1 according to the following third equation:

$$R(n+1) = MS(n+1)$$

wherein R(n+1) in inequality R(n+1) <MS(n+1) is determined by the first or second equation as appropriate, and MS(n+1) is the number of reservation slots in a data frame at discrete time n+1, and if R(n+1)>MS(n+1), using R(n+1) as determined by the first or second equation as appropriate.

21. The communication system of claim 20 wherein reservation slots are minislots, wherein the slot parameter MP determining means determines the slot parameter MP as follows:

if RDS(n)<DQ(n)<αRDS(n), determine the slot parameter MP based upon the following equation:

$$MS(n+1) = M = \frac{Sem}{e + km}$$

wherein MS(n+1) is the number of minislots in a data frame at discrete time n+1 and corresponds to the slot parameter MP, wherein RDS(n) is the number of data slots in a data frame for discrete time n, wherein DQ(n) is the number of reservation requests waiting to be processed by the first station at time n, wherein α is a constant, wherein M is the number of minislots in steady state, wherein S is the number of slots in a data frame, wherein k is a number corresponding to an average number of data slots reserved by reservation requests, wherein e is 2.718281828 . . . , and wherein m is the number of minislots into which a slot of a data frame may be subdivided;

if DQ(n)<RDS(n), determine the slot parameter MP based upon the following equation:

$$MS(n+1) = m(S - DQ(n))$$

wherein MS(n+1) is the number of minislots in a data frame at discrete time n+1 and corresponds to the slot parameter MP; and, if DQ(n)>αRDS(n), determine the slot parameter MP based upon the following equation:

$$MS(n+1) = M - m\frac{DQ(n) - \alpha RDS(n)}{6}$$

wherein MS(n+1) is the number of minislots in a data frame at discrete time n+1 and corresponds to the slot parameter MP.

22. The communication system of claim 21 wherein Rcol(n) is determined based upon the following equation:

$$Pcol(n) = 1 - \left(\frac{Rcol(n)}{MS(n)-1}\right)\left(\frac{MS(n)-1}{MS(n)}\right)^{Rcol(n)} - \left(\frac{MS(n)-1}{MS(n)}\right)^{Rcol(n)}$$

and wherein Rsuc(n) is determined based upon the following equation:

$$Psuc(n) = \left(\frac{Rsup(n)}{MS(n)-1}\right)\left(\frac{MS(n)-1}{MS(n)}\right)^{Rsup(n)}.$$

23. The communication system of claim 21 wherein Rcol(n) is determined from a look up table which is generated to substantially satisfy the following equation:

$$Pcol(n) = 1 - \left(\frac{Rcol(n)}{MS(n)-1}\right)\left(\frac{MS(n)-1}{MS(n)}\right)^{Rcol(n)} - \left(\frac{MS(n)-1}{MS(n)}\right)^{Rcol(n)}$$

and wherein Rsuc(n) is determined from a look up table which is generated to substantially satisfy the following equation:

$$Psuc(n) = \left(\frac{Rsup(n)}{MS(n)-1}\right)\left(\frac{MS(n)-1}{MS(n)}\right)^{Rsup(n)}.$$

24. The communication system of claim 21 wherein c=1/e.

25. A communication system comprising:

a master station;

a plurality of slave stations, wherein the plurality of slave stations communicate to the master station in a data frame having MS reservation slots and/or DS data slots, wherein the plurality of slave stations communicate data to the master station in the DS data slots, wherein the plurality of slave stations communicate reservation requests to the master station in the MS reservation slots, wherein MS may vary from $MS_{min}$ to $MS_{max}$, and wherein DS may vary from $DS_{min}$, to $DS_{max}$; and, a frame controller at the master station arranged to control the MS reservation slots and DS data slots in a data frame dependent upon load.

26. The communication system of claim 25 wherein the data frame has S slots, wherein $MS_{max}=S$, and wherein $DS_{min}=0$.

27. The communication system of claim 26 wherein the data frame has S slots, wherein $DS_{max}=S$, and wherein $MS_{min}=0$.

28. The communication system of claim 26 wherein the data frame has S slots and wherein $MS_{min}=S-DS_{max}\neq 0$.

29. The communication system of claim 25 wherein the data frame has S slots, wherein $DS_{max}=S$, and wherein $MS_{min}=0$.

30. The communication system of claim 25 wherein the data frame has S slots and wherein $MS_{min}=S-DS_{max}\neq 0$.

31. The communication system of claim 25 wherein the master station includes means for determining a range parameter R, wherein the range parameter R is based upon a number of reservation requests transmitted by the slave stations.

32. The communication system of claim 31 wherein the master station includes transmitting means for transmitting the range parameter R and a slot parameter corresponding to MS to the slave stations.

33. The communication system of claim 32 wherein each of the slave stations includes means for generating a transmission parameter N, for transmitting a reservation request to the master station if the transmission parameter N corresponds to the slot parameter, and for abstaining from transmitting a reservation request to the master station if the transmission parameter N does not correspond to the slot parameter, wherein a reservation request, if any, is transmitted in a reservation slot.

34. The communication system of claim 33 wherein the transmission parameter N is a random number with a range corresponding to the range parameter R.

35. A station connectable to a network comprising:

a receiver arranged to receive a downstream data frame having a range parameter and a variable reservation slot parameter;

a transmission parameter generator arranged to generate a transmission parameter according to the range parameter; and, a transmitter arranged to transmit a reservation request in a reservation slot of an upstream data frame if the transmission parameter and the reservation slot parameter have a predetermined relationship and to abstain from transmitting a reservation request if the transmission parameter and the reservation slot parameter do not have the predetermined relationship.

36. The station of claim 35 wherein the upstream data frame has S slots, wherein the S slots include MS reservation slots and/or DS data slots, wherein MS may vary from $MS_{min}$ to $MS_{max}$, wherein DS may vary from $DS_{min}$ to $DS_{max}$, wherein $MS_{max}=S$, and wherein $DS_{min}=0$.

37. The station of claim 36 wherein the upstream data frame has S slots, wherein $DS_{max}=S$, and wherein $MS_{min}=0$.

38. The station of claim 36 wherein the upstream data frame has S slots and wherein $MS_{min}=S-DS_{max}\neq 0$.

39. The station of claim 35 wherein the upstream data frame has S slots, wherein the S slots include MS reservation slots and/or DS data slots, wherein MS may vary from $MS_{min}$ to $MS_{max}$, wherein DS may vary from $DS_{min}$ to $DS_{max}$, wherein $DS_{max}=S$, and wherein $MS_{min}=0$.

40. The station of claim 35 wherein the upstream data frame has S slots, wherein the S slots include MS reservation slots and/or DS data slots, wherein MS may vary from $MS_{min}$ to $MS_{max}$, wherein DS may vary from $DS_{min}$ to $DS_{max}$, and wherein $MS_{min}=S-DS_{max}\neq 0$.

41. The station of claim 35 wherein the transmission parameter is a random number.

42. A station connectable to a network receiver comprising:

a receiver arranged to receive a downstream data frame having a range parameter R and a variable slot parameter MP;

a transmission parameter generator arranged to generate a transmission parameter N, wherein the transmission parameter N is less than about R; and, a transmitter arranged to transmit a reservation request on the basis of the transmission parameter N, the variable slot parameter MP, and the range parameter R, wherein the reservation request is transmitted in a reservation slot of an upstream data frame.

43. The station of claim 42 wherein the upstream data frame has S slots, wherein the S slots include MS reservation slots and/or DS data slots, wherein MS may vary from $MS_{min}$ to $MS_{max}$, wherein DS may vary from $DS_{min}$ to $DS_{max}$, wherein $MS_{max}=S$, and wherein $DS_{min}=0$.

44. The station of claim 43 wherein the upstream data frame has S slots, wherein $DS_{max}=S$, and wherein $MS_{min}=0$.

45. The station of claim 43 wherein the upstream data frame has S slots and wherein $MS_{min}=S-DS_{max}\neq 0$.

46. The station of claim 42 wherein the upstream data frame has S slots, wherein the S slots include MS reservation slots and/or DS data slots, wherein MS may vary from $MS_{min}$ to $MS_{max}$, wherein DS may vary from $DS_{min}$ to $DS_{max}$, wherein $DS_{max}=S$, and wherein $MS_{min}=0$.

47. The station of claim 42 wherein the upstream data frame has S slots, wherein the S slots include MS reservations slots and/or DS data slots, wherein MS may vary from $MS_{min}$ to $MS_{max}$, wherein DS may vary from $DS_{min}$ to $DS_{max}$, and wherein $MS_{min}=S-DS_{max}\neq 0$.

48. The station of claim 42 wherein the transmitter transmits a reservation request to the master station if the transmission parameter N is between about 0 and about the variable slot parameter MP, and for abstaining from transmitting a reservation request to the master station if the transmission parameter N is between about the variable slot parameter MP and about the range parameter R.

49. The station of claim 42 wherein the transmission parameter N is a random number.

* * * * *